United States Patent [19]
Arman

[11] 3,872,535
[45] Mar. 25, 1975

[54] SUPPORT FOR WINDSHIELD WIPER BLADES

[76] Inventor: Dario Arman, Piazza adriano 15, Torino, Italy

[22] Filed: Feb. 12, 1973

[21] Appl. No.: 331,647

[30] Foreign Application Priority Data
Mar. 20, 1972 Italy .................................. 67879/72

[52] U.S. Cl. ............................................. 15/250.42
[51] Int. Cl. ............................ B60s 1/04, B60s 1/40
[58] Field of Search ....... 15/250.31, 250.32, 250.42, 15/250.36, 250.35

[56] References Cited
UNITED STATES PATENTS
3,405,421   10/1968   Tomlin ............................. 15/250.42

FOREIGN PATENTS OR APPLICATIONS
155,394   2/1954   Australia ......................... 15/250.42
1,262,991   4/1961   France ............................. 15/250.42
1,520,334   2/1968   France ............................. 15/250.42

Primary Examiner—Peter Feldman

[57] ABSTRACT

A support for conventional windshield wiper blades for motor vehicles which precludes oxidation of moving parts thereof and permit noiseless operation of the wipers, which support comprises a rectangularly cross-sectional arcuate central rod with a pair of curved terminals connected to rocker arms of plastic material, a pair of hollow seats in the central part of the rocker arms for receiving the curved terminals, and trough-like seats at the ends of the rocker arms for retaining the conventional reinforcing metal strip of the wiper blade.

2 Claims, 8 Drawing Figures

PATENTED MAR 25 1975 3,872,535

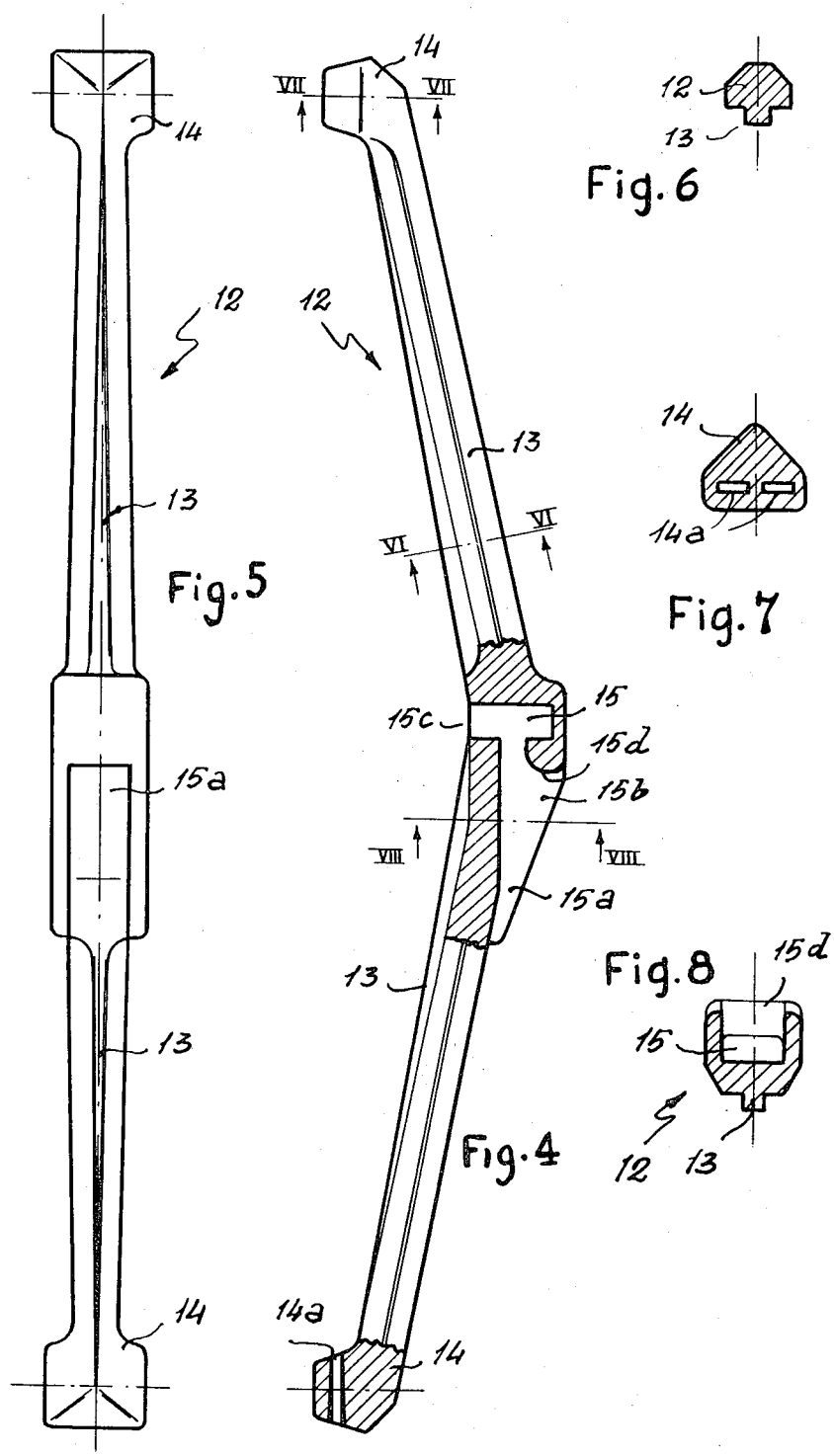

SUPPORT FOR WINDSHIELD WIPER BLADES

FIELD OF THE INVENTION

The present invention relates, in general, to windshield wiper blades for automotives and, in particular, to an improvement concerning the back support of windshield wiper blades for motor vehicles and the like.

BACKGROUND OF THE INVENTION

As it is well known, the back support of a windshield wiper blade comprises a central rod provided with a member suitable to be removably connected to the end of a corresponding swinging arm, and two or more small bridges, so-called "rocker arms," two of which are centrally pivoted on the ends of the central rod and have their own ends either pivotably connected to the back of some other rocker arms or connected to the metal blade or blades which reinforce the back of the windshield wiper blade.

In most recently known windshield wiper blades, the entire back support is metallic, that is, both central rod and rocker arms are made of a pressed metal sheet or of a metal strap and, therefore, they comprise articulations with transverse pins which are subjected to oxidation and produce troublesome noises, particularly after a certain period of use.

SUMMARY OF THE INVENTION

The back support of each windshield wiper blade, according to the present invention overcomes these disadvantages in that, while the central rod is made of a metallic sheet which has a transverse cross section substantially rectangular in order to present the least possible resistance to the back flow of air, the rocker arms are made of molded plastic material and are connected to the ends of the central rod by means of an embedding seat centrally formed on the back or dorsal portion of each rocker arm.

Another particular feature of the support according to the invention resides in that the junctions between the ends of the central rod and the back side of the embedding seats of each rocker arm display an engagement of the curved terminals of the rod within said seats without the use of any articulating pin.

THE DRAWINGS

These and other features of the present invention will become more apparent from the following detailed description of an embodiment thereof and from the accompanying drawings, presented solely for illustrative and non-limitative purposes, in which:

FIG. 4 is a side elevational and enlarged, partly cross-sectional view of a rocker arm showing the section of one end and the central part;

FIG. 5 is a plan view of the same rocker arm of FIG. 4, taken from its back side; and FIGS. 6, 7 and 8 are cross-sectional views of the same rocker arm of FIG. 4 taken along lines VI—VI, VII—VII and VIII—VIII respectively.

DETAILED DESCRIPTION OF THE INVENTION

Figure 1:
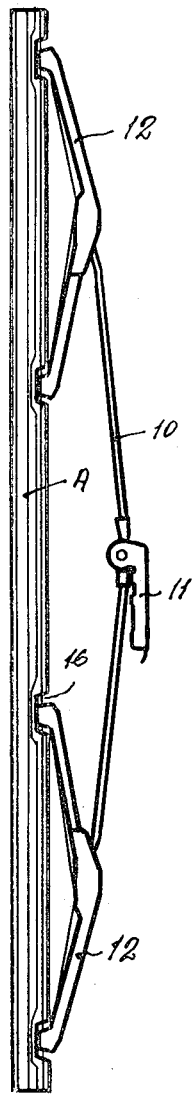
FIG. 1 is a side elevational view of a windshield wiper blade according to the invention.

Referring now to the accompanying drawings, the windshield wiper blade of the invention comprises a central metal rod 10 on the curved back of which are pivotably mounted a connector 11 for the connection of the rod with the corresponding swinging arm (not shown), a pair of rocker arms 12 and a conventional windshield wiper blade A, made of rubber or other suitable material.

As already mentioned, rocker arms 12 are made of a suitable molded plastic material, have an arcuate shape and are provided with longitudinal ribs 13 and protruding terminals 14 of arcuate profile.

Figure 3:
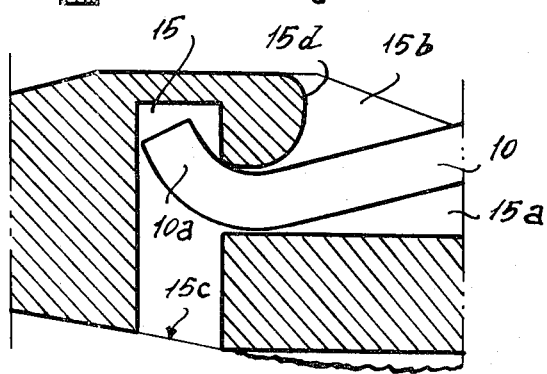
FIG. 3 is an enlarged cross-sectional view of the back embedding formed on each rocker arm, engaged by one of the rod terminals.
Figure 2:
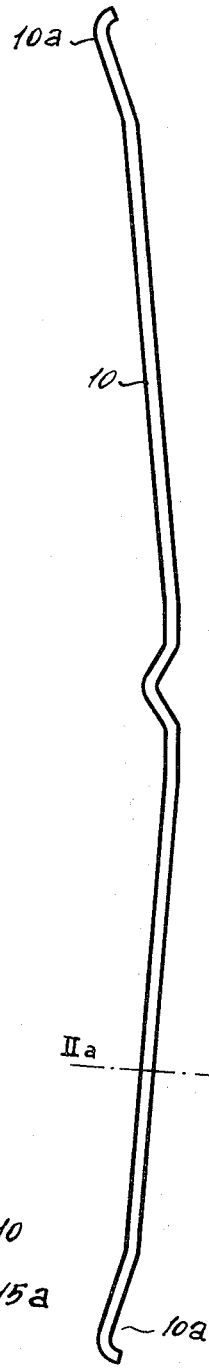
FIG. 2 is an enlarged side view of the central rod of the blade of FIG. 1.

In the central part of the back of each rocker arm 12 there is provided a pre-stamped molded seat 15 which comprises an opening 15a with a fit entry 15b enlarged towards the back. The seat 15 is open at 15c and is formed in the shape of a T with openings 15a and 15c substantially at right angle to each other, as a receptacle suitable to receive one curved end 10a of the rod 10 which rod, when mounted between the two small bridges of seat 15, becomes increasedly curved through elastic deformation, thus allowing the terminals 10a to penetrate by snap action within the corresponding seats 15. The curved edges 15d of each seat engage the end 10a of the rod as shown on FIG. 3, and, while these edges prevent the accidental release of the rod 10, they allow a slight clearance between the end 10a and the seat.

As best shown on FIGS. 1, 4 and 7, the ends 14 of each rocker arm 12 are provided with a pair of trough-like seats 14a. The seats 14a of one end being aligned with those of the opposite end and are intended to accommodate the conventional flexible metal strips 16 supporting the rear side of the windshield wiper blade A.

The wiper blades, according to the above described embodiment have, therefore, a much simpler structure than heretofore; their assembly is rendered easier and their production cost is much lower when compared to the traditional wiper blades. Furthermore, the articulations between the ends 10a of rod 10 and the rocker arms 12, as well as the junctions of said rocker arms at 16 with respect to the blade or blades are not subjected to oxidation, thus considerably prolonging the life of the windshield wiper blades and furthermore render noiseless the wiper blades operation when subjected to the conventional reciprocating movement.

It is to be understood that the improvement according to the present invention is not limited by the embodiment hereabove described, but it is capable of modifications and variations within the scope of the invention.

What is claimed is:

1. In a support for windshield wiper blades for motor vehicles having a central metallic arcuate rod with curved terminals and a pair of plastic rocker arms connected to the central rod, the improvement consisting of a hollow seat in the central portion of each of said rocker arms shaped as a T and composed of two interconnected cavities provided therein and substantially normal to each other with an intermediate fit entry for movably retaining within one of said cavities of said seat said terminals of said arcuate rod, said terminals being curved away from the rocker arms and toward the arcuate rod and said rod having a substantially rectangular cross-section.

2. The improvement according to claim 1, wherein said fit entry intermediate said interconnected cavities has a single surface thereof curved to facilitate the insertion of the terminal into said seat and the movability of the terminal when inserted therein.

* * * * *